Jan. 12, 1926. 1,569,120
W. S. C. GLOVER
DEVICE FOR FASTENING DOORS, WINDOWS, AND THE LIKE
Filed April 10, 1923 4 Sheets-Sheet 1
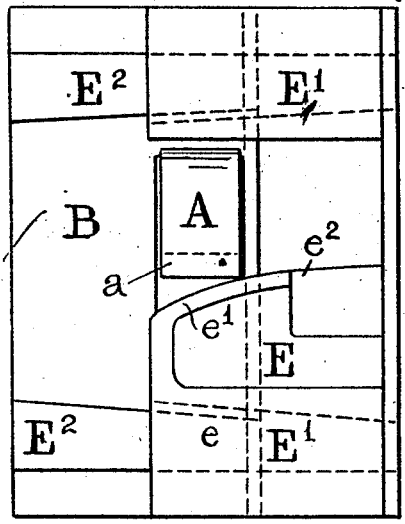
Fig.5
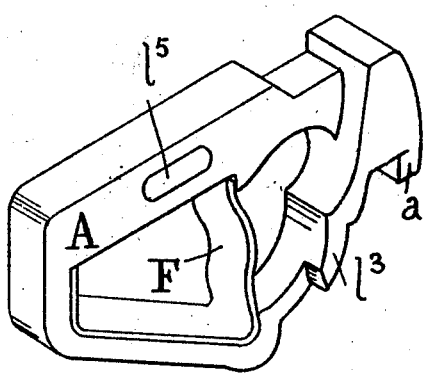
Fig.7.
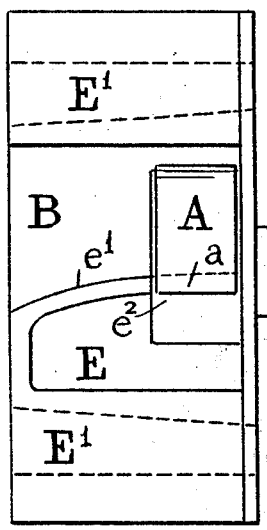
Fig.6.
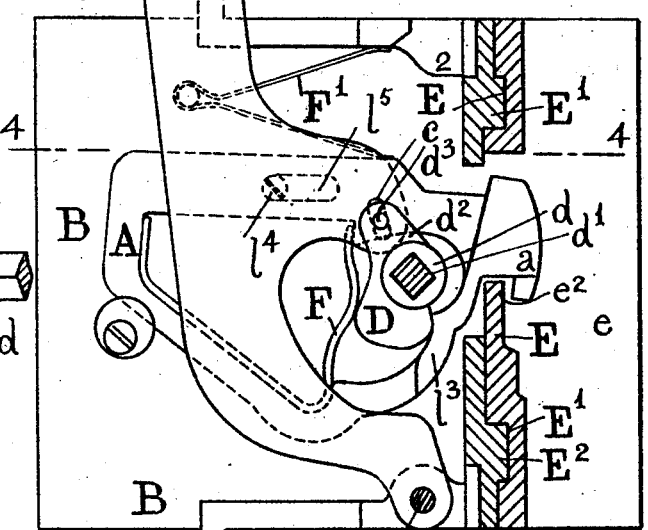
Fig.1.
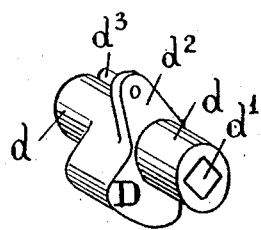
Fig.8.
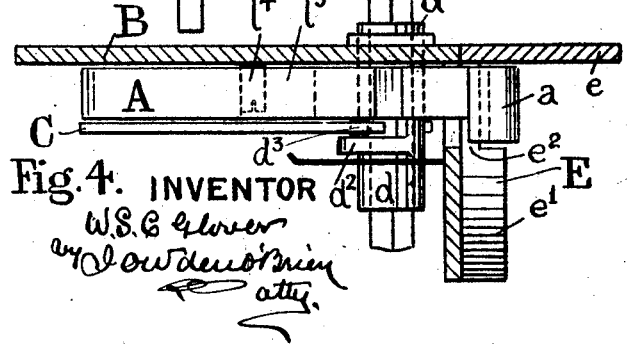
Fig.4. INVENTOR
W.S.C. Glover Jan. 12, 1926.  
W. S. C. GLOVER  
1,569,120  
DEVICE FOR FASTENING DOORS, WINDOWS, AND THE LIKE  
Filed April 10, 1923  4 Sheets-Sheet 2

INVENTOR

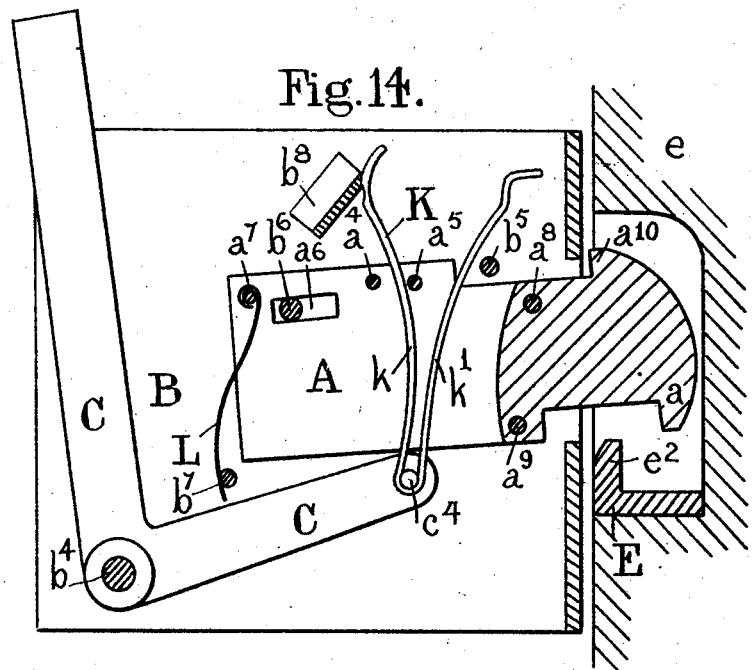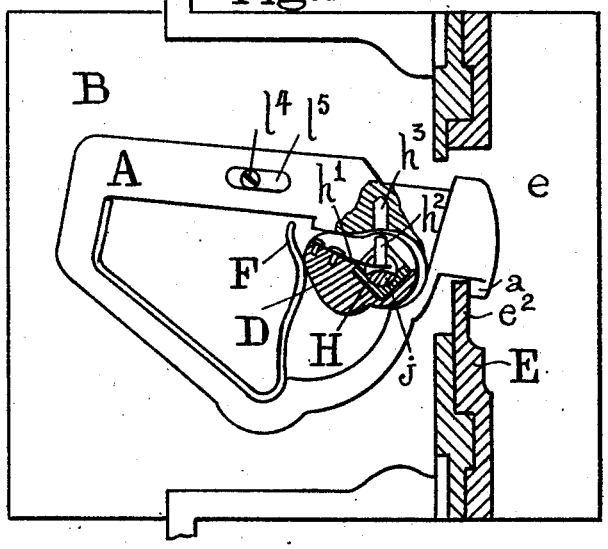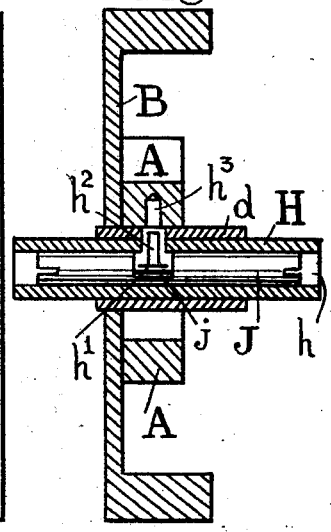

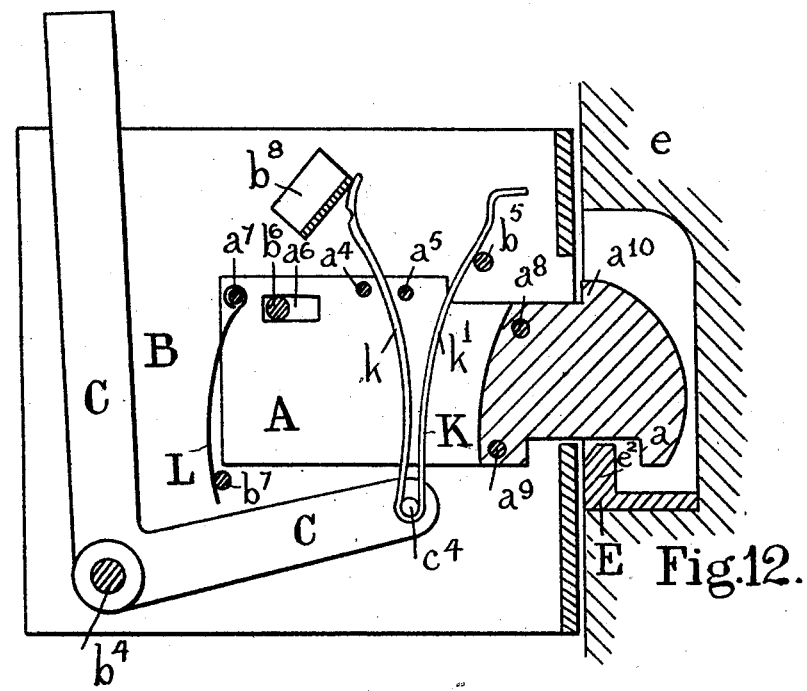
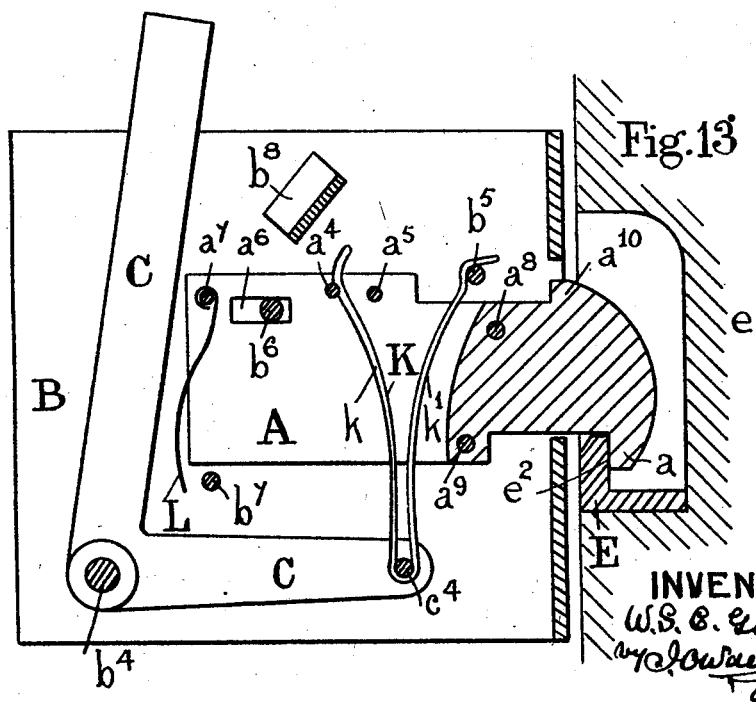

Patented Jan. 12, 1926.

1,569,120

UNITED STATES PATENT OFFICE.

WILLIAM STEPHEN COX GLOVER, OF OXFORD, ENGLAND.

DEVICE FOR FASTENING DOORS, WINDOWS, AND THE LIKE.

Application filed April 10, 1923. Serial No. 631,195.

*To all whom it may concern:*

Be it known that I, WILLIAM STEPHEN COX GLOVER, a British subject, residing at Oxford, county of Oxford, England, have invented certain new and useful Improvements in Devices for Fastening Doors, Windows, and the like, of which the following is a specification.

This invention relates to an improved fastening device for fastening doors, windows, boxes and the like.

It is designed to provide means whereby the joint can be tightened after the latch is engaged to prevent rattle or movement of the door, window or the like, or to take up progressive wear in the sides of the joint.

It consists in mounting the latch member in a floating condition which can be moved by a cam, eccentric or wedge actuated by a handle or lever to tighten the hooked end of the latch after the latter is in position behind the ramp plate.

The invention will be described with reference to the accompanying drawings which show several modifications applicable for the doors of motor cars.

Fig. 1 is a side view partly in section of the arrangement showing the latch in position behind the ramp on the jamb plate before being tightened.

Fig. 4 is a sectional plan on line 4—4 Fig. 1.

Fig. 5 is an end view with latch commencing to ride up ramp.

Fig. 6 is a similar view showing final position with door closed as in Fig. 1.

Fig. 7 is a perspective view of the latch.

Fig. 8 is a perspective view of the tightening cam.

Fig. 9 is a side view partly in section showing means for locking the latch when in the tightened position.

Fig. 10 is a vertical section through the locking device.

Fig. 11 is an end view of the locking device.

Fig. 12 is an end view of a modified arrangement showing the latch in position behind the ramp on the jamb plate before being tightened.

Fig. 13 is a similar view showing the end of the latch tightened against the ramp.

Fig. 14 is a similar view with the end of the latch raised clear of the ramp to allow the door to be opened. In the form of the invention shown in Figs. 1 to 8 the latch member A is held in the casing B which is affixed to the door so that the hooked or catch end $a$ can move up or down and the whole latch move longitudinally. The cam D for tightening the end $a$ against the ramp E mounted on the jamb $e$ of the door is carried on a tubular or cylindrical member $d$ pivotally mounted at the ends in the casing B. The member $d$ is preferably formed with a rectangular hole $d'$ into which the rectangular stem of an operating handle or knob can be inserted to operate the cam in addition to or in place of a lever C. A second rise or projection $d^2$ is formed on the member $d$ carrying a pin $d^3$ which engages in a slot $c$ in the lever C.

The floating latch member A which is in the form of a frame carries a spring F one end of which engages the rear of the member and the other engages the cam D. The spring F acts as a force against which the cam D acts to move the member A to cause the catch $a$ to be held against the ramp E. Any further movement of the cam D through the rotation of the handle or the lever C compresses the spring F. A second spring F' tending to force the catch end of the latch member A downwards is anchored to the casing B and bears on the top of the latch member A.

Figure 2:
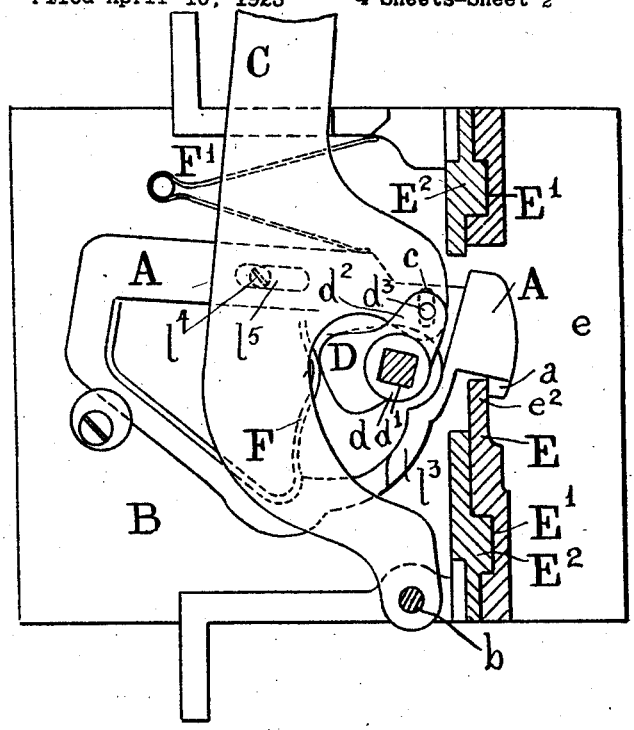
Fig. 2 is a similar view showing the end of the latch tightened against the ramp.

When the door is open and all the parts in equilibrium they are approximately in the same position as shown in Fig. 1; the closing of the door causes the catch $a$ to ride up the inclined face $e'$ of the ramp E, the catch $a$ being moved upwards until the parts assume a position approximately the same as shown in Figs. 1 and 5. When the catch $a$ passes the end of the inclined face $e'$ the spring F' forces the end $a$ downwards so that the catch falls behind the edge $e^2$ of the ramp E thereby preventing the door from being opened until the catch is again lifted. To tighten the catch $a$ against the edge $e^2$ of the ramp the tubular member $d$ is rotated either by means of the operating lever C, through the pin $d^3$, or by the handle or knob acting through the rectangular hole $d'$ as shown in Fig. 2.

The rotation of the tubular member $d$ causes the cam D to bear against the spring F and push the latch member A back until the catch $a$ comes in contact with the edge $e^2$ of the ramp E. Further rotation of the member $d$ and the cam D, as it cannot move the latch A compresses the spring F thereby setting up a spring cushioned tension on the catch $a$.

Figure 3:
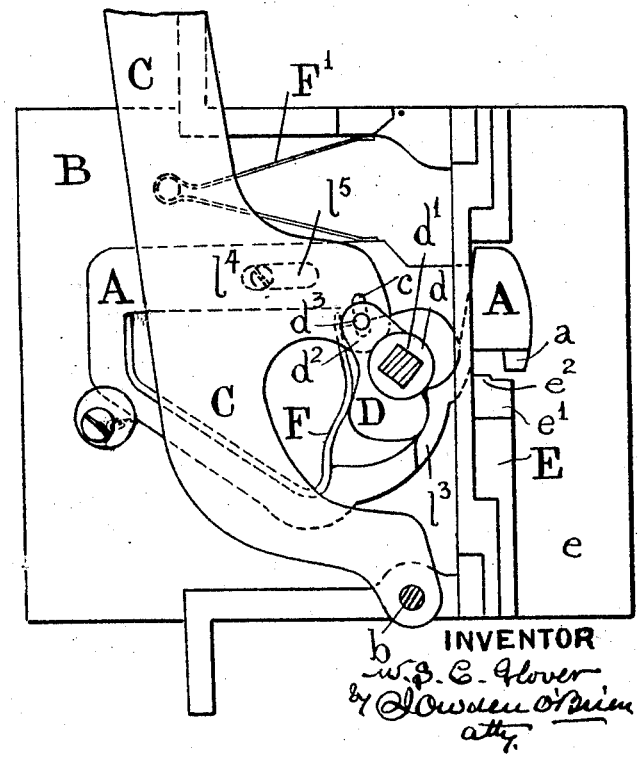
Fig. 3 is a similar view showing the end of the latch raised clear of the ramp to allow the door to be opened.

To open the door the tubular member $d$ is rotated in the reverse direction either through the pin $d^3$ by moving the lever C to the position shown in Fig. 3 or by the knob or handle through the rectangular hole $d'$. The rotation of the member $d$ carries with it the cam D the first period of the rotation releasing the pressure on the spring F; further rotation causing the floating latch A to be moved forward by the cam D engaging the face $l^3$ of member A, the last period of the rotation causing the catch $a$ to be lifted clear of the ramp E as shown in Fig. 3, the latch A rocking on the pin $l^4$ carried on the casing B and passing through the slot $l^5$.

Where the vertical handle is not required the lever C and its connections $d^3$ and $d^2$ to the tubular member $d$ may be omitted and the rotation of the tubular member $d$ may be effected by the knob or handle through the rectangular hole $d'$.

To ensure the latch A being guided to the correct position in relation to the ramp E when the door is closed grooves E' are formed on the jamb $e$ to receive corresponding guides $E^2$ on the face plate of the lock on the door.

In cases where it is desired to provide locking means to prevent the door from being opened after the fastening means have been tightened up, a rectangular stem H with a cylindrical hole $h$ is inserted in the tubular member $d$ (see Figs. 9, 10 and 11). The cam D, member $d$ and stem H are cut away from a short distance to allow of the introduction of a short leaf spring $h'$ carrying a pin or projection $h^2$ adapted to enter a recess $h^3$ in the latch A. A tube J is inserted in the hole $h$ and formed with a cam surface $j$ so that when the tube J is rotated the pin or projection $h^2$ is forced into the recess $h^3$ thereby locking the member $d$ to the latch A. The tube J may be fitted with wards so that it can only be rotated by a corresponding key.

In the form of the invention shown in Figs. 12, 13 and 14, the operating lever C is of bell crank form pivotally mounted on a stud $b^4$ projecting from the casing B. The latch A is formed of two plates connected together by the pins $a^8$, $a^9$ a space being formed between the two plates at the rear. A pin $c^4$ is affixed to the end of the lever C and engages with a spring K having two arms $k$, $k'$ extending upwards between the two parts of the latch A. The pins $a^4$ and $a^5$ are so arranged that when the spring K is pushed up the arm $k$ disengages from the pin $a^4$ and engages with the pin $a^5$, the further upward movement of the spring K causes the arm $k$ to push forward the pin $a^5$ and with it the floating latch A. A pin $b^6$ on the casing B passes through a slot $a^6$ in the latch so that the latch A can rotate about the pin $b^6$ and move longitudinally in relation thereto. A spring L is anchored to a stud $a^7$ on the latch A adapted to engage with a pin or projection $b^7$ on the casing B when the latch is in certain positions and causes the latch to pivot about the pin $b^6$. A projection $b^8$ on the upper part of the casing B is engaged by the arm $k$ of the spring K when, by movement of the lever C the spring K has been pushed upwards and its ends $k$ and $k'$ have cleared the pins $a^4$ and $b^5$.

This projection $b^8$ is so arranged that as the spring is pushed further up the arm $k$ must slide along the projection and be thereby pushed forward. The end of the projection is cut away at a fixed point to allow the spring to rise vertically.

The latch A and other parts are in a position approximate to that shown in the Fig. 12 when the door is open; when the door is closed the catch $a$ rides up the inclined face of the ramp E and the parts assume a position corresponding to that shown in Fig. 14. When the catch $a$ reaches the top of the ramp the weight of the latch A and the action of the spring L cause the catch $a$ to fall behind the edge of the ramp again into the position shown in Fig. 12. To tighten the catch $a$ against the side $e^2$ of the ramp E the operating lever C is moved into the position shown in Fig. 13. This causes the spring K to move from the projection $b^8$ and act between the pin $b^5$ and the pin $a^4$ forcing $a^4$ and the latch A with it backwards until the catch $a$ engages against the side $e^2$ of the ramp E, the end of the movement forcing the arms of the spring K into compression between the pins $a^4$ and $b^5$ thereby exerting spring cushioned tension on the catch $a$. To open the door the lever C is moved to the position shown in Fig. 14 so that the arm $k$ comes against the projection $b^8$ and the pin $a^5$ the further movement upwards of the spring K causing the pin $a^5$ with the latch A to move forward in relation to the spring and the spring itself to move forward in relation to the projection $b^8$. When the arm $k$ of the spring K passes the end of the projection $b^8$ it moves vertically and causes the latch A to rotate about the pin $b^6$ thereby lifting the catch $a$ clear of the ramp E.

The shoulder $a^{10}$ on the top of the floating latch A is so arranged that when the latch A is in its normal position as shown in Figs. 12 and 13, the shoulder works in the slot in the case B but when the latch A is not in its normal position (as shown in Fig. 14) the shoulder $a^{10}$ will engage against the corner of the case B and prevent the bolt A from moving back thereby keeping the space between the pins $a^4$ and $b^5$ so small that the spring K cannot be pulled down into place, thereby preventing the lever C being moved to its tight position and so showing that the latch has not caught.

With any of the arrangements described above the same mechanism latches or unlatches the door and tightens up the joint so that it will take up progressive wear or expansion or contraction due to climatic or other causes.

What I claim as my invention and desire to protect by Letters Patent is:—

1. In a fastening device for doors, windows and similar purposes of the type comprising a casing affixed to the door and a floating latch member carried thereby, the combination with the casing and floating latch member of a device located within the latch member for actuating same, a lever pivoted to the casing to engage the actuating device, guides for the latch member, a ramp up which the catch end of the latch member mounts and behind which it falls, means for drawing the catch end into contact with the vertical edge of the ramp to tighten the latch in the locked position, spring means to prevent the latch member when in engagement with the ramp from undue strain if movement occurs between the frame and the door, said means also preventing rattle of the door against the frame and means to prevent the latch from being accidently moved from the locked position.

2. A fastening device for doors, windows and similar purposes comprising the combination with a casing of a floating latch member having an aperture therein, a cam located in the aperture in the latch member for operating the latter, a transverse spindle on which the cam is mounted, a spring within the aperture in, and affixed to the floating latch member to engage the cam, an operating handle pivoted to the casing, a pin carried by the cam to engage a slot in the operating handle, guides for the latch member, a ramp up which the catch end of the latch member mounts and behind which it falls, means for drawing the catch end into contact with the ramp to tighten the latch in the locked position, spring means to prevent the latch member when in engagement with the ramp from undue strain if movement occurs between the frame and the door, said means also preventing rattle of the door against the frame and means for preventing the latch from being accidentally moved from the locked position.

In testimony whereof I have hereunto set my hand.

WILLIAM STEPHEN COX GLOVER.